Patented May 8, 1923.

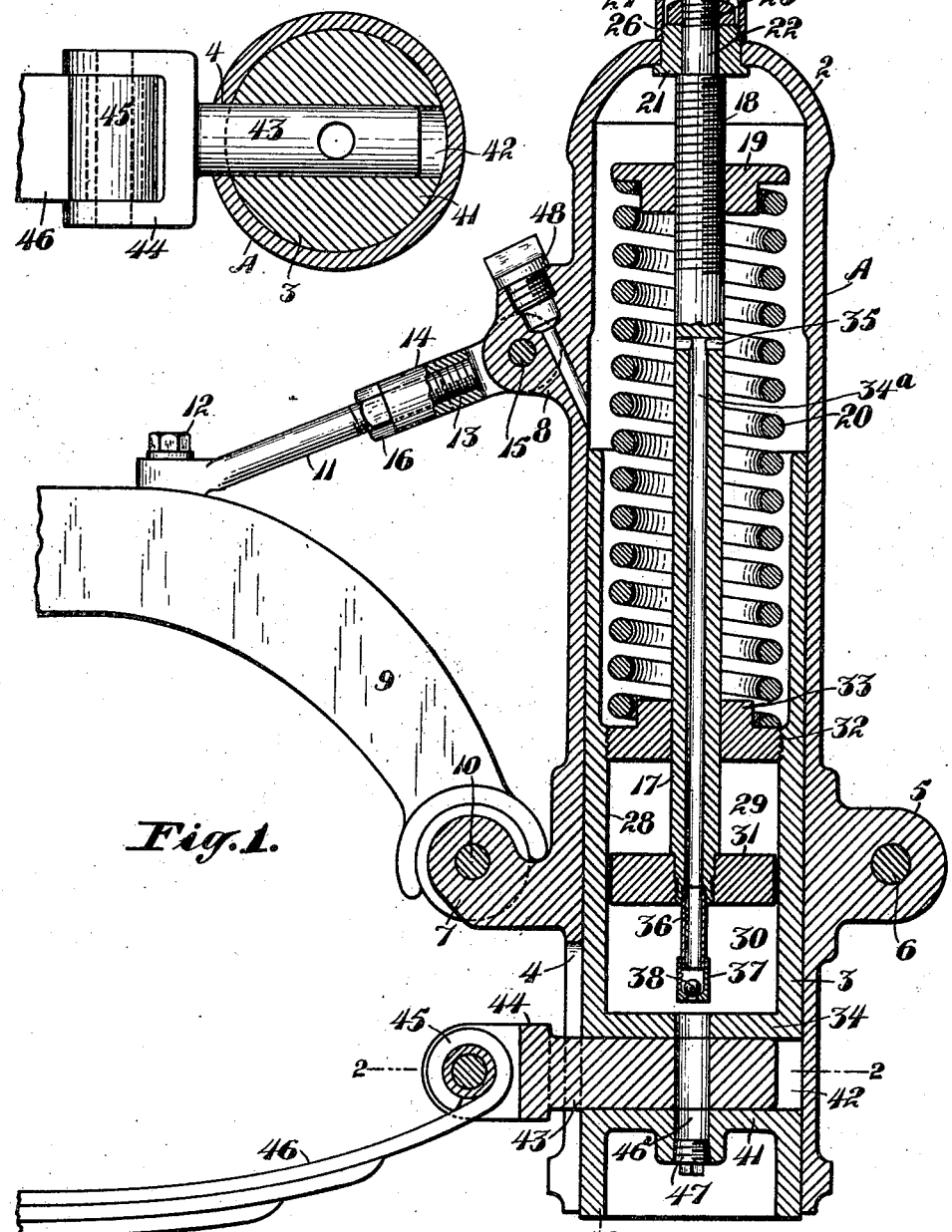

1,454,393

UNITED STATES PATENT OFFICE.

ZELMERE P. LOYD AND HENRY W. LARSSON, OF OAKLAND, CALIFORNIA, ASSIGNORS TO LOYD MFG. CO., OF OAKLAND, CALIFORNIA, A CORPORATION OF CALIFORNIA.

SHOCK ABSORBER.

Application filed May 11, 1921. Serial No. 468,506.

*To all whom it may concern:*

Be it known that we, ZELMERE P. LOYD and HENRY W. LARSSON, citizens of the United States, residing at Oakland, in the county of Alameda and State of California, have invented new and useful Improvements in Shock Absorbers, of which the following is a specification.

This invention relates to a shock absorber, and especially to improvements on the structure shown in a copending application entitled "Shock absorber," filed May 12, 1920, Serial No. 380,758.

One of the objects of the present invention is to generally improve and simplify the construction and operation of shock and rebound absorbers, to render the same reliable, durable and efficient in use, comparatively simple and inexpensive to manufacture, and above all sensitive and capable of absorbing and dissipating substantially all shocks and vibrations caused by obstructions or undulations in a road surface.

Another object of the invention is to provide a shock absorber in which all shocks, vibrations and rebounds are absorbed by pneumatic and spring action; further to provide a rigid housing or cylinder, together with a piston in which the spring and entire mechanism is enclosed and protected from dust, grit and moisture.

Another object of the invention is to construct a shock absorber which is so arranged that all parts may be readily lubricated, further to provide means for automatically maintaining the lubricant in constant circulation.

Another object of the invention is to provide a shock absorber which may be installed on practically any car without cutting the frame or in any way changing the spring connections.

Further objects will hereinafter appear.

The invention consists of the parts and the construction, combination and arrangement of parts as hereinafter more fully described and claimed, having reference to the accompanying drawings, in which—

Fig. 1 is a central, vertical, longitudinal section of the shock absorber showing it attached to an automobile.

Fig. 2 is a cross section on line 2—2, Fig. 1.

Referring to the drawings in detail, A indicates a main cylinder, the upper end of which is closed by a head member 2 suitably secured thereto or formed integral therewith as here illustrated. The lower end of the cylinder is open to permit insertion of an inverted piston generally indicated at 3, and the lower end of the cylinder is also slotted longitudinally as indicated at 4 for purposes to be hereinafter described. Formed on the front side of the cylinder is a lug 5, which is perforated to receive a tie rod 6, and formed on the rear side of the cylinder is a pair of lugs as indicated at 7 and 8; the lug 7 forming a pivotal attachment between the front end of the main frame 9 and the cylinder by the insertion of a pin or bolt 10, while the upper lug 8 forms a means of rigidly securing the cylinder to the frame by means of a screw rod 11. The rod 11 is secured at one end to the frame by means of a bolt 12, while the opposite end enters a threaded extension 13 formed on a fork-shaped connecting member 14. The forked end straddles the lug 8 and is secured thereto by a pin or bolt 15. The threaded extension permits adjustment of the rod 11, which is secured by means of a lock nut 16 when the desired adjustment has been secured.

Centrally disposed within the main cylinder A is a rod 17. The upper end of this rod is threaded as at 18 to receive a collar or nut 19, between which and the piston 3 is interposed a helical spring 20. Secured in the upper end of the main cylinder or in the head 2 is a bushing 21. Extending therethrough is an extension 22, which is formed on the upper end of the rod 17. This extension is threaded as at 23 to receive a lock nut 24, and it terminates in a squared end 25 to permit the rod to be turned as will hereinafter be described. The bushing 21 extends a slight distance beyond the upper end of the head 2 and it is threaded as at 26 to receive a dust cap 27. The main piston 3 is, as previously described, inverted. It is reciprocally mounted within the cylinder A and its lower end is bored as at 28 to form a cylinder chamber which is divided into two sections 29 and 30 by means of an auxiliary piston 31. The upper end of the bore 28 is threaded as at 32 to receive a head member 33 which forms a closure for the chamber 29. A similar closure is formed for the chamber 30 by means of the bottom of the piston indicated at 34. The rod 17 extends through the head member 33 and is secured to the auxiliary piston in any suitable manner. The rod is also provided with a central passage 34$^a$ which terminates in a pair of lateral passages 35 at one end. The opposite end communicates with a tube 36 screwed or otherwise secured in the lower end of the rod and this tube in turn supports a valve cage 37, in which is mounted a ball check 38. The lower end 34 of the inverted piston is extended to form a skirt or guide portion 40. It is also considerably reinforced as indicated at 41 to permit it to be drilled as at 42 for the reception of a pin 43 which terminates in a forked extension 44 provided for the reception of an eye 45 of a semi-elliptical or other shaped spring indicated at 46. The pin 43 is pressed or driven into the opening 42 and the pin, together with the reinforced lower end of the piston 34 is drilled longitudinally to form a well or passage 46, the lower end of which is closed by means of a plug 47.

The upper end of the main piston receives the main supporting spring 20. It also forms a cup-shaped member, the bottom portion of which is closed by means of the head 34, said cup shaped member being provided, first for the purpose of receiving the spring 20, and secondly as a receptacle for a heavy oil or other lubricant which is introduced through a cup 48.

With the several parts assembled and connected to the main frame and spring 46, as illustrated in Fig. 1, it can readily be seen that the spring 20 will support the main load of the vehicle; further that any shocks transmitted to the running gear from the road surface will cause the main piston 3 to reciprocate within the main cylinder against the tension of the spring 20. The adjustable nut or collar 19 carried by the rod 17 permits the tension of the spring 20 to be adjusted to suit varying size vehicles and loads. Such adjustment is readily accomplished by removing the dust cap 27, releasing the lock nut 24, and then engaging the upper squared end of the rod by means of a wrench or the like. A turning movement imparted to the rod will cause the nut 19 to increase or decrease the tension of the spring and practically any adjustment or tension may thus be secured.

The lubricant employed is, as previously stated, admitted through the priming cup 48 and when so admitted will naturally gravitate into the cup shaped upper end of the main piston. Continuous reciprocation of the main piston within the cylinder caused by road shocks and undulations encountered in a road surface will cause the lubricant to splash about within the cup and the cylinder and thus thoroughly lubricate the surfaces formed between the main piston and the cylinder. A certain amount of oil will also leak by the rod 17 where it passes through the head 33. This oil will thus lubricate the surfaces formed between the bore 28 and the auxiliary piston 31, and any excess quantity of oil thus admitted will leak by the piston 31 and collect in the well or lower passage 46 from where it is returned to the cup shaped upper end of the piston by means of the valve 38 and the passage 34$^a$ formed within the rod; that is excess movement of the main piston will cause the tube 36 and the valve cage 37 to enter the well 46$^a$. Any oil contained in the well will thus pass by the valve 38 and enter the passage 34$^a$ through the tube 36; the oil admitted being checked against return movement by the valve 38.

In actual operation it can readily be seen that the main shocks and vibrations will be absorbed and dissipated by means of the spring 20; further that excess movement will be checked by means of the auxiliary piston 31, that is the piston 31 is stationary as far as the main piston 3 is concerned as it is fixed by means of the rod 17 to the main cylinder A. Reciprocal movement of the piston three therefore takes place not only with relation to the main cylinder A, but also with relation to the auxiliary piston 31. Entrained air contained in the chambers 29 and 30 will thus be subjected to compression whether the piston 3 moves in one direction or another, and such compression will take care of excess movement in either direction, not only when the vehicle is subjected to a heavy shock, but also during the rebound movement.

For the purpose of securing the piston 3 against rotation within the main cylinder, the slot 4 has been provided. The pin 43, forming the connection between the semi-elliptical spring and the piston 3, passes through the slot 4 and is guided thereby. The pin, together with the slot, thus secures the piston against rotation and at the same time permits a free reciprocal movement thereof. The means of connecting the piston with the semi-elliptical spring also avoids the necessity of cutting the main frame 9 for the purpose of increasing the distance between the attaching point 10 and the pin 43, thus decreasing the length and general size of the shock absorber as a whole.

The shock absorber here illustrated may be arranged at the front of a vehicle or at the rear thereof. They should always be arranged in pairs, and to brace the cylinders with relation to each other, we provide the lugs 5 and the tie rods 6, that is a rod is passed between the cylinders and bolted to each of the same, thus materially bracing and rendering the mounting rigid.

The shock absorber here illustrated has been constructed with the object in view of reducing the number of parts employed to a minimum, thus materially decreasing the cost of manufacture and the liability of breakage, etc.; this being all accomplished without in any way detracting from the sensitive and efficient action of the device as a whole, and while certain features of the present invention are more or less specifically illustrated, we wish it understood that various changes in form and proportion may be resorted to within the scope of the appended claims, similarly that the materials and finish of the several parts employed may be such as the experience and judgment of the manufacturer may dictate or varying uses may demand.

Having thus described our invention, what we claim and desire to secure by Letters Patent is:—

1. A shock absorber comprising a main cylinder, an inverted piston reciprocally mounted therein, a closed cylinder chamber formed in the piston, an auxiliary piston mounted in said chamber, means for maintaining a fixed relation between said piston and the main cylinder, a spring interposed between the main piston and the main cylinder, and means for adjusting the tension of said spring.

2. A shock absorber comprising a main cylinder, an inverted piston reciprocally mounted therein, a cylinder bore formed in the piston, said bore being closed at one end by a fixed piston head and at the opposite end by a removable piston head, a centrally disposed rod in the main cylinder and extending through the removable cylinder head, an auxiliary piston secured on the lower end of the rod, means securing the other end of the rod to the main cylinder, an adjustable nut carried by the rod, and a spring interposed between said nut and the inverted piston.

3. The combination with the main frame and one of the semi-elliptical springs of a motor vehicle, of a cylinder adapted to be secured to the main frame, an inverted piston reciprocally mounted in said cylinder and extending through one end thereof, means forming a connection between said piston and the semi-elliptical spring, a spring within the cylinder interposed between the piston and the cylinder and substantially enclosed by the piston, a dashpot formed in one end of said piston, a piston in said dashpot dividing the dashpot into two chambers, and a rod secured at one end to the cylinder and having its opposite end secured to the piston and the dashpot.

4. The combination with the main frame and one of the semi-elliptical springs of a motor vehicle, of a cylinder adapted to be secured to the main frame, an inverted piston reciprocally mounted in said cylinder, means forming a connection between said piston and the semi-elliptical spring, a spring within the cylinder interposed between the piston and the cylinder, a dashpot formed in one end of said piston, a piston in said dashpot dividing the dashpot into two chambers, a rod secured at one end to the cylinder and having its opposite end secured to the piston and the dashpot, an oil receiving cup-like extension formed in the first named piston, and means for maintaining a circulation of oil between the dashpot and the chambers and said oil receiving extension.

5. A shock absorber comprising a main cylinder, an inverted piston reciprocally mounted therein, said piston having its lower end closed by a head member, a cylinder bore formed in the piston adjacent the head end therof, a removable head forming a closure for said cylinder chamber, an auxiliary piston in said cylinder chamber, a rod secured to the main cylinder and having its lower end extending through the removable cylinder head, means securing the auxiliary piston to the lower end of the rod, a nut on the rod, a spring interposed between said nut and the removable cylinder head, and means for imparting a turning movement to the rod from the exterior of the cylinder to raise or lower the nut on the rod and thereby increase or decrease the tension of the spring.

6. A shock absorber comprising a main cylinder, an inverted piston reciprocally mounted therein, said piston having its lower end closed by a head member, a cylinder bore formed in the piston adjacent the head end thereof, a removable head forming a closure for said cylinder chamber, an auxiliary piston in said cylinder chamber, a rod secured to the main cylinder and having its lower end extending through the removable cylinder head, means securing the auxiliary piston to the lower end of the rod, a nut on the rod, a spring interposed between said nut and the removable cylinder head, means for imparting a turning movement to the rod from the exterior of the cylinder to raise or lower the nut on the rod and thereby increase or decrease the tension of the spring, an oil retaining cup-like chamber formed in the upper end of the piston, an oil collecting well formed in the lower fixed head of said piston, and means for maintaining a circulation of oil between said well and the cup-like chamber on the piston.

7. A shock absorber comprising a main cylinder, an inverted piston reciprocally mounted therein, said piston having its lower end closed by a head member, a cylinder bore formed in the piston adjacent the head end thereof, a removable head forming a closure for said cylinder chamber, an auxiliary piston in said cylinder chamber, a rod secured to the main cylinder and having its lower end extending through the removable cylinder head, means securing the auxiliary piston to the lower end of the rod, a nut on the rod, a spring interposed between said nut and the removable cylinder head, means for imparting a turning movement to the rod from the exterior of the cylinder to raise or lower the nut on the rod and thereby increase or decrease the tension of the spring, an oil retaining cup-like chamber formed in the upper end of the piston, an oil collecting well formed in the lower fixed head of said piston, a central passage formed in the rod, lateral openings in the rod communicating with the cup-like extension and with said central passage, a tubular extension on the lower end of the rod adapted to enter the well, and a check valve in said tube.

8. A shock absorber comprising a cylinder, a piston reciprocally mounted therein, spring cushioning means interposed between the cylinder and the piston adapted to absorb a normal load means for adjusting the tension of said spring cushioning means, and pneumatic means within the piston for absorbing maximum loads.

9. A shock absorber comprising a cylinder, a piston reciprocally mounted therein, spring cushioning means interposed between the cylinder and the piston adapted to absorb a normal load, a closed dashpot chamber formed in the piston, an auxiliary piston mounted in the dashpot and dividing the dashpot into two separate chambers, said auxiliary piston adapted to pneumatically absorb maximum loads, and means maintaining a fixed position between the auxiliary piston and the main cylinder.

10. A shock absorber comprising a cylinder, a piston reciprocally mounted therein, cushioning means interposed between the cylinder and piston, a cylinder chamber formed in the piston, an auxiliary piston mounted therein, means for maintaining a fixed position between the auxiliary piston and the main cylinder, and cushioning means interposed between each end of the auxiliary piston and the main piston.

ZELMERE P. LOYD.
HENRY W. LARSSON.